Dec. 22, 1931.  R. W. BROWN  1,837,403
DENTAL HANDPIECE CHUCK
Filed Dec. 28, 1929
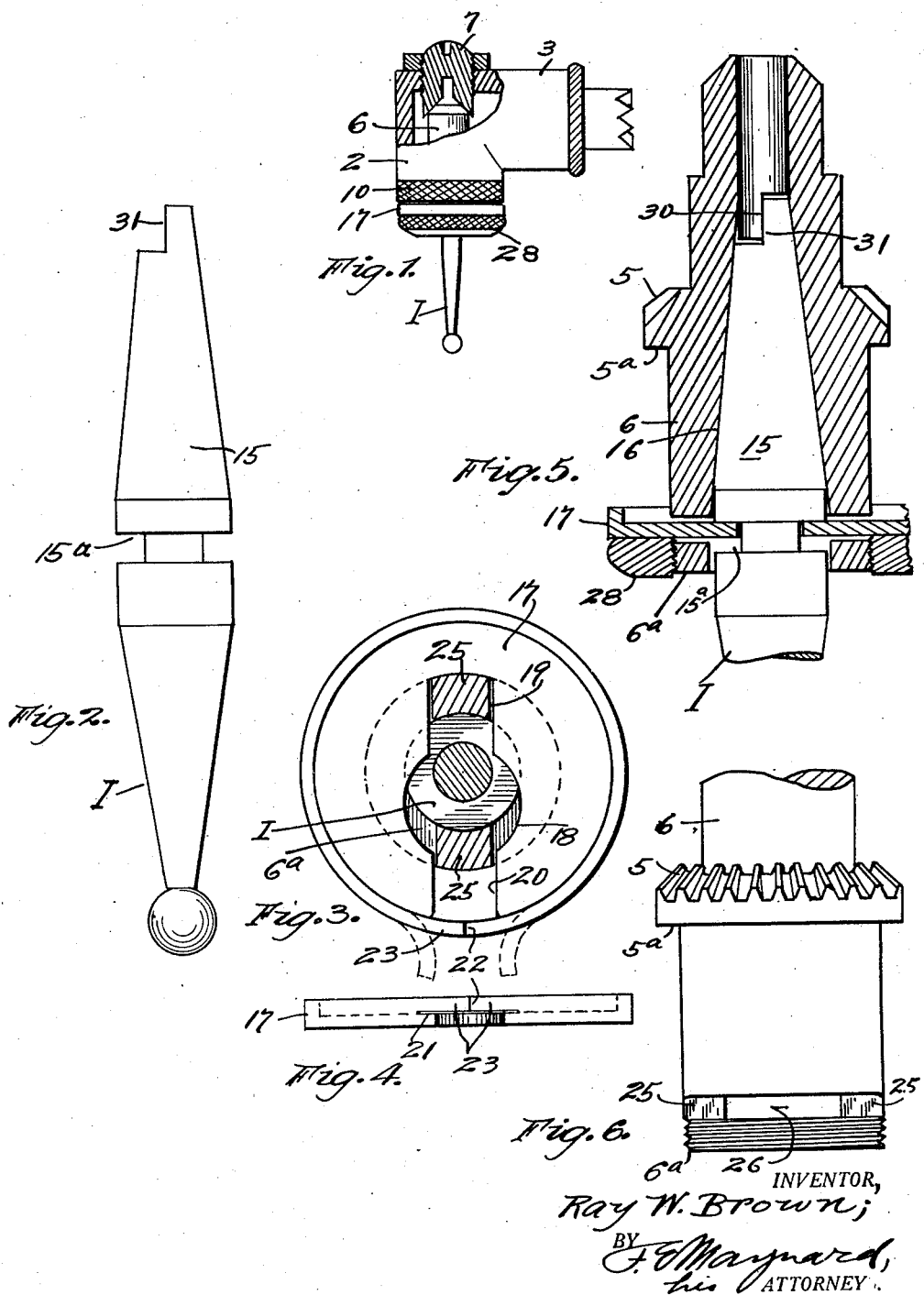
INVENTOR,
Ray W. Brown;
BY
his ATTORNEY.

Patented Dec. 22, 1931

1,837,403

UNITED STATES PATENT OFFICE

RAY W. BROWN, OF DENVER, COLORADO, ASSIGNOR TO HENRY DALZELL WILSON, OF PITTSBURGH, PENNSYLVANIA

DENTAL HANDPIECE CHUCK

Application filed December 28, 1929. Serial No. 417,086.

This invention relates to tool chucks and more especially to chucks for dental hand pieces in which quite small tools are to be secured firmly and on true running axis for tooth drilling of high precision and with as little mechanical vibration as is possible.

It is an object to provide a chuck which will operate smoothly, truly and efficiently and yet will be simple in the application and detachment of the effective tool.

An important object is to provide a chuck which enables the practitioner to insert the tool with ease and rapidity and which has a visible, effective latching means affording instant inspection as to whether it is in free or in retaining position as to a tool, and further provides for the positive centering and firmly setting of the tool in the chuck chamber.

Another object is to provide a tool chuck, which while affording high accuracy and vibrationless action yet enables the use of tool shanks which need not be of such high degree of mechanical accuracy and fine dimensions as to be prohibitively costly.

Dental hand pieces are naturally of such small size that the parts must be of relatively small dimensions and yet by my present invention an effective and rugged chuck is produced: one in which the delicate parts still have such design and organization as will insure strength, serviceability and reasonable cost.

An object is to provide a chuck which can be operated by wet fingers and requires little pressure.

Further, an object is to provide a latch which will automatically open by centrifugal action when unlocked and thus give notice of its unlocked state, when this is not desired.

In other words, an object is to provide a "fool-proof" tool for this class of instruments, by supplying a locking device in which all manually adjusted elements are in full view, are easily accessible and the unlatched state made self-evident.

The invention consists in certain advancements in this art as set forth in the ensuing disclosure and having, with the above, additional objects and advantages, and whose construction, combination and details of means, and the manner of operation will be made manifest in the ensuing description of the herewith illustrative apparatus; it being understood that modifications, variations and adaptations may be resorted to within the scope, principle and spirit of the invention as it is more directly claimed hereinafter.

Figure 1 is a side elevation partly broken away, of the complete device as adapted to a dental hand piece.

Figure 2 is a side elevation of a dental burr adapted for the chuck.

Figure 3 is a plan of the chuck latch in closed position on a burr shank, and showing the chuck body legs in cross-section.

Figure 4 is a side view of the chuck latch.

Figure 5 is an axial section of the chuck parts closed on an inserted shank and seating it.

Figure 6 is a side elevation of the leg end of the chuck body.

The present tool is an improvement of that type of dental engines as shown in my Patents Nos. 1,548,180—1,621,190—1,701,172 and also involves the use of a non-jamming-angle of tool shank as set out in my application S. N. 336,317, filed Jan. 30, 1929.

The hand piece here shown includes a shell 2 having a lateral hub 3 for a driving pinion (not shown) which is in constant mesh with a gear 5 fixed or cut on a running barrel 6.

The upper end of this barrel has bearing against an adjustable cap 7 screwing into and closing the top of the shell.

The lower end of the barrel is journaled in a bushing 10 threaded into the shell and presenting an end face to the ledge 5ª of the barrel. It will be seen that the end play of the barrel can be carefully controlled between the bushing 10 and the cap 7 by screwing the latter in or out as needed to allow the barrel to easily turn with the least possible end lash.

An important feature of the present invention resides in the means for securely interlocking a desired implement in the running barrel. In the device shown the implement has a conical shank 15 complementary to the socket 16 in the barrel 6, the angle of the bar being such that it will preclude of the shank from sticking in the socket and yet affording ample bearing to prevent lateral play in the socket.

Since such angle shank would drop out unless restrained the present chuck includes a shallow cup or disc 17, which has a diametrical slot including a generally circular, medial part 18 with opposite radial and narrower end portions 19 and 20 the latter extending to the cup rim where this has been sawed at 21 in the top plane of the bed of the cup, and also slit at 22.

When the slit horns 23 are first bent out to open the slot 18—19—20, the cup can be shifted into place across parallel narrow legs 25 formed in the chuck body at its lower end by cross saw slots 26 deep enough to intersect the bore for the implement I.

The cup slot hole 18 is large enough to admit the body 15 of the implement I and this has an annular groove 15ᵃ which is materially deeper (longitudinally) than the thickness of the bed of the cup 17.

Therefore the cup can be pushed to one side to bring the hole 18 coaxial with the chuck socket and the shank 15 pushed up through the cup and against the seat in the bore and then the cup is pushed back so that the narrow slot 19 straddles in the neck 15ᵃ of the shank 15, thus acting as a retaining latch to prevent the implement from dropping out.

In addition to this latch feature however, still more security is had by means of a clamp-nut 28 which screws onto the threaded lower end 6ᵃ of the barrel 6 and joined thereto by the legs 25. The shank is of such length that it projects into the plane of the slots 26 and therefore, when engaged by the bed of the cup 17 this is kept below the top of the slots 26.

The clamp nut 28 is now run up to engage the bottom of the cup (or latch) and this is then pressed upward and forces the conical shank 15 home to its seat in the conical bore 16 of the barrel; the cup still being clear of the barrel surfaces so that the implement is solidly held to the barrel and runs unitarily therewith, as also do the cup-latch and the nut.

Positive rotative interlock is secured by mutual abutment or drive-key facets 30—31 of the barrel and the shank 15, respectively.

When the shank is to be removed it is only necessary to slack up the nut 28 and while the drill is running centrifugal action will throw the unbalanced cup-latch out to one side and draw the hole 18 over on center, in which position the implement will fall out if the tool is held plumb and drill down. Or it can be picked out from any position of the tool in the hand.

What is claimed is:

1. A chuck and implement device including an implement having a shank shoulder, a chuck having a seat for the implement, a latch laterally shiftable to receive the implement as this is seated, and means acting through the latch to seat the implement; said latch operative in one position to interlock with the said shank and retain the inserted implement and provided with a clearance aperture to de-lock from the shank, the latch having limited lateral outward movement.

2. A chuck and implement combination comprising a shouldered implement, and a chuck having an attached latch which has a differential dimension hole within its borders; said latch movable laterally to a limited degree while in place to admit the implement to the chuck and shiftable inwardly radially to retain the inserted implement.

3. A chuck and implement combination comprising a shouldered implement, and a chuck having an attached latch which has a diametrical differential dimension hole; said latch movable outwardly across the chuck to a limited degree to admit the implement to the chuck and closable radially thereon to retain the inserted implement, and means to force the latch and the implement to seated position.

4. A chuck and implement combination comprising a shouldered implement, and a chuck having an attached slidable latch with limited outward shift and which has a differential dimension hole from top to bottom; said latch movable outwardly to its limit to admit the implement to the chuck and closable radially to retain the inserted implement, and means acting through the latch to seat the implement in the chuck.

5. A chuck structure including a rotary body part, having a conical internal seat for a complementary tool shank, a collar threaded onto the lower end of the body, and a floating member supported by the collar in irremovable attachment to the said body; said member having a differential hole which in one position of the member allows insertion of the implement to the seat and in another position interlocks with the implement to prevent extraction.

RAY W. BROWN.